W. H. SHARP.
GLASSWARE AND THE LIKE.
APPLICATION FILED DEC. 14, 1911.
1,057,889. Patented Apr. 1, 1913.
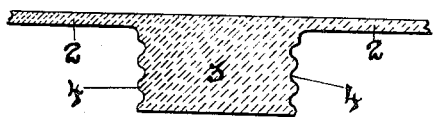
Fig. 1.
Fig. 2.
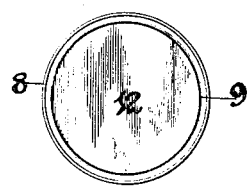
Fig. 3.
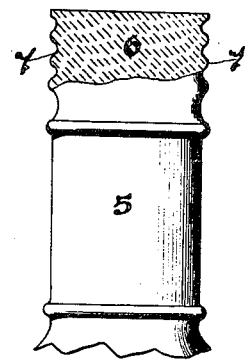
Fig. 4.
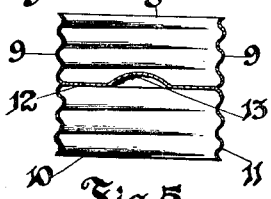
Fig. 5.
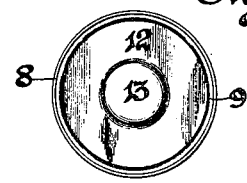
Fig. 6.
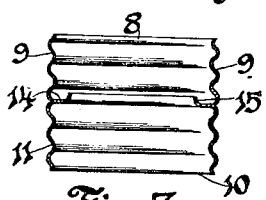
Fig. 7.
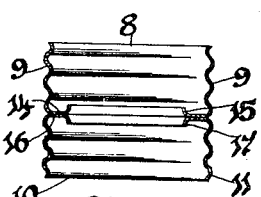
Fig. 8.
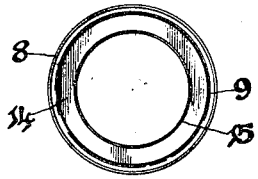
Fig. 9.
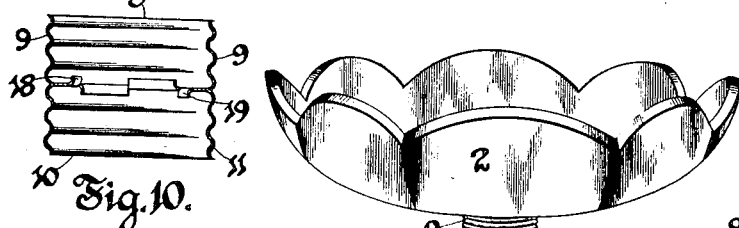
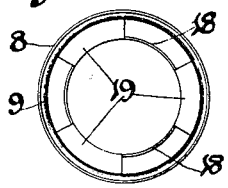
Fig. 10.
Fig. 11.
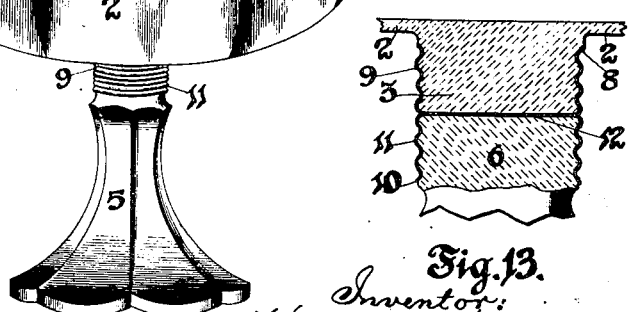
Fig. 12.
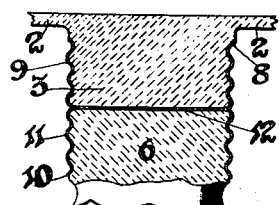
Fig. 13.
Witnesses:
James R. Mansfield
W. H. Wakefield
Inventor:
Walker H. Sharp
By Alexander Dowell
Attorneys

UNITED STATES PATENT OFFICE.

WALKER HENRY SHARP, OF COLLINGWOOD, MELBOURNE, VICTORIA, AUSTRALIA.

GLASSWARE AND THE LIKE.

1,057,889.        Specification of Letters Patent.        Patented Apr. 1, 1913.

Application filed December 14, 1911. Serial No. 665,722.

*To all whom it may concern:*

Be it known that I, WALKER HENRY SHARP, a subject of the King of Great Britain and Ireland, and a resident of 232 Smith street, in the city of Collingwood, a suburb of the city of Melbourne, in the county of Bourke, State of Victoria, Commonwealth of Australia, have invented certain new and useful Improvements Relating to Glassware and the Like, of which the following is a specification.

This invention relates particularly to glass stands used for supporting cake fruit and other edibles. Such stands are usually manufactured in two parts,—a dish portion and a base or supporting portion,—which parts are generally welded together. It has been suggested, though, to unite the two parts by screwing or threading but this has not been successful owing to breaking or splitting of the glass. Another suggestion has been to form a recess in one part to loosely accommodate the other part. There have also been numerous other propositions involving the use of holding bolts and the like all of which have increased the liability of breakage.

It will be readily understood that material advantages are derived by retaining the parts separate, during transport, as considerable saving is effected in packing, freight and breakage. Moreover if one part be broken the whole article is not destroyed. The practice of welding still obtains, however, owing to the necessity of a reliable means of detachably securing or connecting the parts.

The object of this invention is to overcome the foregoing objections simply, cheaply and efficiently, retaining the articles separate, but providing for their speedy connection in a reliable manner. The parts may therefore, be connected or disconnected at will and without danger.

Referring to the drawings which form a part of this specification, Figure 1 is a sectional view of portion of the dish of a cake or fruit stand showing a threaded protuberance depending therefrom. Fig. 2 is a sectional view of a connector which in use is threaded to the protuberance. Fig. 3 is a plan of the connector seen in Fig. 2. Fig. 4 is a part sectional view of portion of the base or support of a cake or fruit stand showing a threaded head thereto. Fig. 5 is a sectional view of a modified connector. Fig. 6 is a plan of the connector seen in Fig. 5. Fig. 7 is a sectional view of a connector further modified. Fig. 8 is a modification of the connector shown in Fig. 7. Fig. 9 is a plan of the connector seen in Fig. 7. Fig. 10 is a sectional view of a still further modified connector. Fig. 11 is a plan of the connector seen in Fig. 10. Fig. 12 is a reduced perspective view of a stand with this invention applied. Fig. 13 is a sectional view showing the dish and support of a stand united by a connector as seen in Figs. 2 and 3.

The invention includes a stand for edibles consisting, (Figs. 1, 12 and 13), of a glass or like dish 2, of any suitable conformation, having depending from its bottom a protuberance 3. The size or area of this protuberance may vary. Around its circumference is a thread 4. This may be interrupted or continuous and of any suitable character. The stand also consists (Figs. 4, 12 and 13) of a glass or like base or support 5 of any suitable conformation and area having a head 6. The size or area of this head may vary. Around its circumference is a thread 7. This may be interrupted or continuous and of any suitable character.

With the foregoing is used (Figs. 2, 3, 12, and 13), a metallic or like connector consisting of an upper cylindrical portion 8 around which is a thread 9 and a lower cylindrical portion 10 around which is a thread 11. Between the upper and lower portions and extending across the connector is a diaphragm 12.

The diaphragm 12 (Figs. 5 and 6) may be provided with an extuberance 13 to form a cushion between the two portions or parts of the stand. Or instead of a diaphragm being used an (Figs. 7 and 9) internal circumferential flange 14 may be provided having an upturned cushioning lip 15 around its inner edge. In addition (Fig. 8) to the circumferential flange 14 described a second circumferential flange 16 may be used having a down-turned cushioning lip 17 around its inner edge. This flange may be secured to the flange 14 in any well known way. Or the circumferential flange or flanges may be formed (Figs. 10 and 11) in segments some of which are upturned and some downturned. The upturned segments are marked 18 and form a cushion for the protuberance 3. The down-turned segments are marked 19 and form a cushion for the head 6.

With this invention as shown in Fig. 13 the protuberance 3 of the dish 2 of the stand is accommodated by the upper portion 8 of the connector. The head 6 of the base or support of the stand is accommodated by the lower portion 10 of the connector. The protuberance 3 and head 6 do not meet and grind together causing chipping or splitting but bear against the diaphragm 12. The extuberance 13, lips 15 and 17 and segments 18 and 19 all form in effect cushions between the protuberance 3 and head 6. By the threads 4, 7, 9 and 11, the various parts are firmly and effectually held or retained.

Having now described my invention, what I claim as new and desire to secure by Letters Patent is:—

1. In improvements relating to glassware and the like, a connector consisting of a threaded upper portion and a threaded lower portion, and an internal circumferential flange having a cushioning lip between said upper and lower portions.

2. In improvements relating to glassware and the like, a connector consisting of a threaded upper portion and a threaded lower portion, an internal circumferential flange having an upturned cushioning lip between said portions, and an interal circumferential flange having a downturned cushioning lip between said portions.

3. In improvements relating to glassware and the like, a connector consisting of an upper portion and a lower portion, and upturned and downturned cushioning segments between said upper and lower portions.

4. In improvements relating to glassware and the like, a body having a threaded protuberance, a base having a threaded protuberance, and a connector consisting of a cylindric body having a threaded upper portion to engage the body, a threaded lower portion to engage the base, and an internally projecting cushioning device between said upper and lower portions.

5. Improvement in glassware and the like, comprising a fragile body having a threaded protuberance, a fragile base having a threaded head, and a metallic tubular connector threaded to engage said head and said protuberance and unite the body to the base, said connector also having an internally projecting portion adapted to prevent direct contact between the said protuberance and said head when engaged with said connector, substantially as described.

In testimony whereof I affix my signature in presence of two witnesses.

WALKER HENRY SHARP.

Witnesses:
CECIL M. SLASTREIR,
GEORGE A. U'REN.